US010965999B2

(12) United States Patent
Pappu et al.

(10) Patent No.: US 10,965,999 B2
(45) Date of Patent: *Mar. 30, 2021

(54) SYSTEMS AND METHODS FOR MULTIMODAL MULTILABEL TAGGING OF VIDEO

(71) Applicant: Oath Inc., New York, NY (US)

(72) Inventors: Aasish Pappu, New York, NY (US); Akshay Soni, San Jose, CA (US); Paloma de Juan, New York, NY (US)

(73) Assignee: Oath Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/806,544

(22) Filed: Mar. 2, 2020

(65) Prior Publication Data

US 2020/0204879 A1    Jun. 25, 2020

Related U.S. Application Data

(63) Continuation of application No. 16/124,840, filed on Sep. 7, 2018, now Pat. No. 10,623,829.

(51) Int. Cl.
*H04N 5/445* (2011.01)
*H04N 21/8405* (2011.01)
(Continued)

(52) U.S. Cl.
CPC ....... *H04N 21/8405* (2013.01); *G06F 40/117* (2020.01); *G06F 40/169* (2020.01); *G06K 9/00765* (2013.01); *H04N 21/8456* (2013.01)

(58) Field of Classification Search
CPC .......... H04N 21/8405; H04N 21/8456; H04N 21/251; H04N 21/4394; H04N 21/44008; H04N 21/23418; H04N 21/4884
(Continued)

(56) References Cited

U.S. PATENT DOCUMENTS 6,378,129 B1 *   4/2002   Zetts ................. H04L 29/06027
                                              348/E5.008
6,625,811 B1 *   9/2003   Kaneko .................. H04H 20/12
                                              725/94
(Continued)

OTHER PUBLICATIONS

Everingham et al., "The Pascal Visual Object Classes (VOC) Challenge", International Journal of Computer Vision, Sep. 9, 2009, 36 pages.
(Continued)

*Primary Examiner* — Michael B. Pierorazio
(74) *Attorney, Agent, or Firm* — Ansari Katiraei LLP; Arman Katiraei; Sadiq Ansari

(57) ABSTRACT

Multimodal multilabel tagging of video content may include labeling the video content with topical tags that are identified based on extracted features from two or more modalities of the video content. The two or more modalities may include (i) a video modality for the object, images, and/or visual elements of the video content, (ii) a text modality for the speech, dialog, and/or text of the video content, and/or (iii) an audio modality for non-speech sounds and/or sound characteristics of the video content. Combinational multimodal multilabel tagging may include combining two or more features from the same or different modality in order to increase the contextual understanding of the features and generate contextually relevant tags. Video content may be labeled with global tags relating to overall topics of the video content, and different sets of local tags relating to topics at different segments of the video content.

20 Claims, 6 Drawing Sheets

(51) Int. Cl.
*H04N 21/845* (2011.01)
*G06K 9/00* (2006.01)
*G06F 40/117* (2020.01)
*G06F 40/169* (2020.01)

(58) Field of Classification Search
USPC .......................................................... 725/53
See application file for complete search history.

(56) References Cited

U.S. PATENT DOCUMENTS

| | | | | |
|---|---|---|---|---|
| 8,005,826 | B1* | 8/2011 | Sahami | G06F 16/438 707/723 |
| 8,238,332 | B2* | 8/2012 | Yamashita | H04N 21/23602 370/366 |
| 8,533,761 | B1* | 9/2013 | Sahami | H04N 21/4828 725/53 |
| 8,572,649 | B1* | 10/2013 | Gossweiler, III | H04N 21/4828 725/39 |
| 8,578,042 | B2* | 11/2013 | Hu | H04N 7/165 709/231 |
| 8,631,440 | B2* | 1/2014 | Gossweiler, III | H04N 21/278 725/52 |
| 8,826,443 | B1* | 9/2014 | Raman | H04L 63/20 726/26 |
| 9,130,918 | B2* | 9/2015 | Picconi | H04L 63/08 |
| 9,258,589 | B2* | 2/2016 | Grouf | H04N 21/4821 |
| 10,623,829 | B2* | 4/2020 | Pappu | H04N 21/44008 |
| 2002/0038457 | A1* | 3/2002 | Numata | H04N 21/4583 725/47 |
| 2003/0212708 | A1* | 11/2003 | Potrebic | H04N 21/4334 |
| 2008/0271078 | A1* | 10/2008 | Gossweiler | H04N 5/44543 725/40 |
| 2008/0271080 | A1 | 10/2008 | Gossweiler | H04N 21/4334 725/47 |
| 2009/0070819 | A1* | 3/2009 | Gajda | H04H 60/65 725/46 |
| 2009/0300699 | A1* | 12/2009 | Casagrande | H04N 21/4147 725/116 |
| 2010/0325657 | A1* | 12/2010 | Sellers | H04N 21/2387 725/32 |
| 2012/0110621 | A1* | 5/2012 | Gossweiler | H04N 21/488 725/46 |
| 2012/0192232 | A1* | 7/2012 | Ellis | H04N 7/17336 725/41 |
| 2012/0272264 | A1* | 10/2012 | Suzuki | H04N 21/23113 725/33 |
| 2013/0305287 | A1* | 11/2013 | Wong | H04N 21/482 725/42 |
| 2014/0157312 | A1* | 6/2014 | Williams | H04N 21/4667 725/39 |
| 2014/0189743 | A1* | 7/2014 | Kennedy | H04N 21/44222 725/46 |
| 2014/0351843 | A1* | 11/2014 | Theriault | H04N 21/812 725/25 |
| 2014/0366068 | A1* | 12/2014 | Burkitt | G06F 16/735 725/61 |
| 2015/0082349 | A1* | 3/2015 | Ishtiaq | H04N 21/4884 725/40 |
| 2018/0192083 | A1* | 7/2018 | Flores Guerra | H04N 21/4755 |

OTHER PUBLICATIONS

Zhou et al., "Movie Genre Classification via Scene Categorization", Computational Perception Lab School of Interactive Computing Georgia Institute of Technology, 2010, 4 pages.

Weston et al., "WSABIE: Scaling Up to Large Vocabulary Image Annotation", Google, 2011, 7 pages.

Zheng et al., "Context Recommendation Using Multi-label Classification", Center for Web Intelligence, DePaul University, Chicago, Aug. 14, 2014, 23 pages.

Chen et al., "Feature-aware Label Space Dimension Reduction for Multi-label Classification", 2012, 9 pages.

Kapoor et al., "Multilabel Classification using Bayesian Compressed Sensing", Microsoft Research, 2012, 9 pages.

Yu et al., "Large-scale Multi-label Learning with Missing Labels", 2014, 9 pages.

Bhatia et al., "Locally Non-linear Embeddings for Extreme Multi-label Learning", Microsoft Research, Jul. 10, 2015, 18 pages.

Thomee et al., "The New Data and New Challenges in Multimedia Research", arXiv, Mar. 2015, 8 pages.

Partalas et al., "LSHTC: A Benchmark for Large-Scale Text Classification", arXiv, Mar. 30, 2015, 10 pages.

Xiao et al., "SUN Database: Exploring a Large Collection of Scene Categories", International Journal of Computer Vision, Aug. 13, 2014, 20 pages.

Chen et al., "DocTag2Vec: An Embedding Based Multi-label Learning Approach for Document Tagging", In Proceedings of the 2nd Workshop on Representation Learning for NLP, Aug. 3, 2017, 10 pages.

Soni et al., "RIPML: A Restricted Isometry Property Based Approach to Multilabel Learning", In Proceedings of the Thirtieth International Florida Artificial Intelligence Research Society Conference, 2017, 6 pages.

Liu et al., "Deep Learning for Extreme Multi-label Text Classification", In Proceedings of the 40th International ACM SIGIR Conference on Research and Development in Information Retrieval, SIGIR, Aug. 11, 2017, 10 pages.

\* cited by examiner

SYSTEMS AND METHODS FOR MULTIMODAL MULTILABEL TAGGING OF VIDEO

CLAIM OF BENEFIT TO RELATED APPLICATIONS

This application is a continuation of U.S. nonprovisional application Ser. No. 16/124,840 entitled "Systems and Methods for Multimodal Multilabel Tagging of Video", filed Sep. 7, 2018. The contents of application Ser. No. 16/124, 840 are hereby incorporated by reference.

BACKGROUND ART

Multiple hours of video content are published every day for users to stream via different video delivery platforms. The video content can cover a variety of subjects and/or topics.

Some of the video content may not be labeled with tags. Other video content may be incorrectly labeled with one or more tags that are not sufficiently descriptive of the topics, content, subject matter of the video content.

The tags may allow search engines to find relevant videos based on user provided search criteria, specified user interests, temporal relevance, and/or contextual relevance. Video delivery platforms may also use the tags to provide customized feeds or streams of video content to keep users engaged based on known preferences of the users and/or previous viewing behavior. Accordingly, accurate tagging of video content leads to an improved user experience.

DETAILED DESCRIPTION

The following detailed description refers to the accompanying drawings. The same reference numbers in different drawings may identify the same or similar elements.

Systems and/or methods, as described herein, may provide automatic labeling of video content with one or more tags that are directed to the semantic understanding of the video content as opposed or in addition to the simplistic identification of the objects, images, and/or sounds presented as part of the video content. Accordingly, the system and/or methods may label video content with tags that relate to the topics, content, and/or subject matter underlying the objects, images and/or sounds presented as part of the video content.

In some embodiments, the systems and/or methods may perform a multimodal multilabel tagging of the video content. The multimodal multilabel tagging may include generating tags that are based on extracted features from two or more modalities of the video content. The two or more modalities may include (i) a video modality for the object, images, and/or visual elements of the video content, (ii) a text modality for the speech, dialog, and/or text of the video content, and/or (iii) an audio modality for non-speech sounds and/or sound characteristics of the video content.

The one or more features extracted from each modality may provide different contextually relevant information for different aspects of the video content. In some embodiments, the multimodal multilabel tagging may generate tags directly from the extracted features of the different modalities. In some other embodiments, the multimodal multilabel tagging may use one or more features from one modality to compliment one or more features extracted from another modality in order to increase the relevance of the generated tags to the underlying topics, content, and/or subject matter of the video content.

Figure 1:
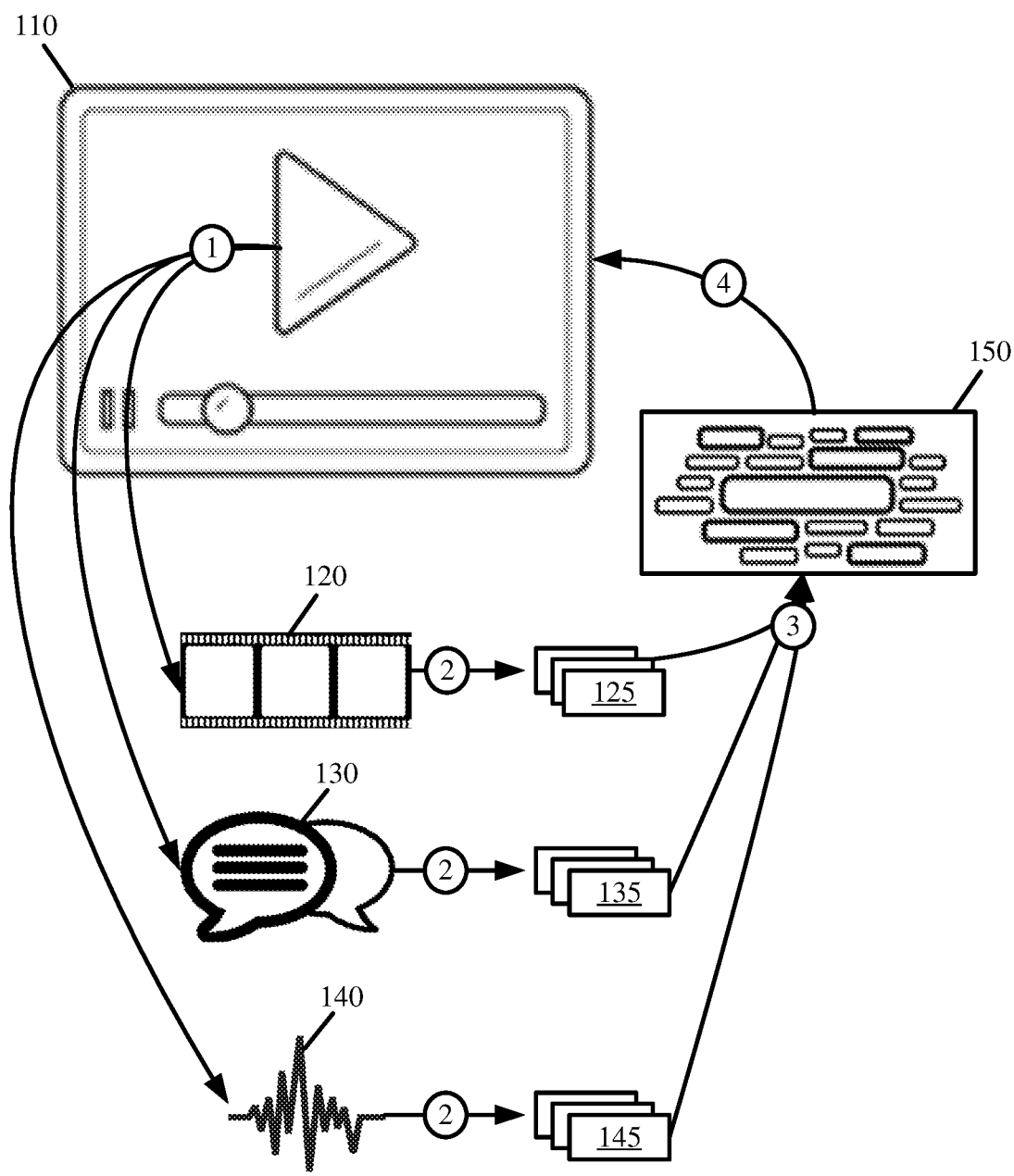
FIG. 1 presents an example of multimodal multilabel tagging of video content in accordance with some embodiments presented herein.

FIG. 1 presents an example of multimodal multilabel tagging of video content in accordance with some embodiments presented herein. The figure illustrates video content 110, different modalities 120, 130, and 140 of video content 110, different features 125, 135, and 145 extracted from each modality 120, 130, and 140, and tags 150 associated with the underlying content of video content 110.

Video content 110 may include a set of video frames, audio, and/or metadata that are encoded as a file (e.g., an mp4 file), or a set of files (e.g., transport stream segments) with each file of the set of files encoding a different segment of video content 110. Video content 110 may span a duration of seconds, minutes, or hours. Each segment of video content 110 may span a subset of the overall duration. Video content 110 may be played on a user device that locally stores video content 110, or that downloads or streams video content 110 via HyperText Transport Protocol ("HTTP"), HTTP Live Streaming ("HLS"), HTTP Dynamic Streaming ("HDS"), HTTP Smooth Streaming ("HSS"), and/or other protocols. Video content 110 may be stored on one or more servers of a video delivery platform.

In FIG. 1, the multimodal multilabel tagging may include partitioning (at 1) video content 110 into video modality 120, text modality 130, audio modality 140, and/or other modalities. Video modality 120 may include the visual or graphical elements of video content 110. Text modality 130 may include the speech, dialog, and/or text of video content 110. Text modality 130 may be obtained from closed captions that are associated with video content 110 as metadata or other data. Text modality 130 may alternatively be obtained via automated speech recognition and transcription. Audio modality 140 may include the audio of video content 110. More specifically, audio modality 140 may include the non-speech sounds and/or sound characteristics of video content 110.

The multimodal multilabel tagging may include extracting (at 2) first set of features 125 from the objects, images, and/or visual elements of video modality 120, second set of features 135 from the text of second modality 130, and/or third set of features 145 from the sounds and sound characteristics of third modality 140. First set of features 125 may include identifiers (e.g., textual descriptors) for objects, images, colors, actions, activities, events, and/or other visual elements identified from video content 110. Second set of features 135 may be extracted from processing and tokenizing the spoken dialog with the resulting tokens representing topics, objects, actions, activities, events, and/or other context that can be implied from the spoken dialog. Third set of features 145 may include sound characteristics that can be extracted from processing the audio of video content 110. For instance, third set of features 145 may include tone, pitch, loudness, weighting of the auditory spectrum, frequency, pitch period deviations, average absolute different between jitters, local (e.g., frame-to-frame) jitter, harmonics-to-noise ratio, mel-frequency cepstral coefficients, local pitch period amplitude deviations, and/or other characteristics of the audio.

The multimodal multilabel tagging may include generating (at 3) one or more tags 150 from each set of features 125, 135, and 145. In some embodiments, the one or more tags may be generated from tags of a previously tagged dataset having features that match one or more of extracted features 125, 135, and 145. In some embodiments, the multimodal multilabel tagging may use machine learning to determine links between one or more features of the previously tagged dataset and one or more tags associated with the video content forming the dataset. The multimodal multilabel tagging may then label video content 110 with tags that are derived from extracted features that are similar or related (e.g., conceptually, contextually, temporally, etc.) to features of the determined links.

In some embodiments, the multimodal multilabel tagging may include filtering the tags generated (at 3) from each set of features 125, 135, and/or 145. The filtering may remove the least relevant tags and retain the most relevant tags. The most relevant tags may include tags that are generated from repeated instances of the same feature in sets of features 125, 135, and/or 145. The least relevant tags may include tags that are generated from a single or the fewest instances of the same feature in sets of features 125, 135, and/or 145.

The filtering may also be based on a weighting that is dynamically attributed to each modality 120, 130, and 140 based on a root tagging or classification of video content 110. The filtering may provide greater weight and may retain tags that are generated from extracted features of prioritized modalities, and may provide lesser weight and may discard tags that are generated from extracted features of deprioritized modalities. For instance, video content 110 may be labeled with a root tag of "news". The topics of news related video content may be determined primarily from the features that are extracted from text modality 130 as the topics are best determined from dialog of a news anchor. The images of video modality 120 and/or sounds of audio modality 140 may provide less information about the topics and/or context of the news related video content than the text of text modality 130. In such cases, the tags generated from extracted features 135 of text modality 130 may be retained or weighted more heavily during filtering than the tags generated from extracted features 125 of video modality 120 or extracted features 145 of audio modality 140. As another example, video content 110 may be labeled with a root tag of "sports". The topics of sports related video content may be determined primarily from features that are extracted from video modality 120. In such cases, the tags generated from extracted features 125 of video modality 120 may be retained or weighted more heavily during filtering than the tags generated from extracted features 135 of text modality 130, or extracted features of 145 of audio modality 140.

The tags 150 may be added (at 4) to video content 110 as metadata. The metadata may identify the topics and/or contextual relevance of video content 110. For instance, news related video content may be labeled with tags "politics", "foreign policy", and "president". The metadata may also be used to index video content 110 for search purposes and/or for including video content 110 as part of customized feeds provided to different users based on related user preferences. For instance, the system may receive user preferences, may identify tags 150 associated with video content 110 matching the user preference, and may provide video content 110 to a corresponding user device via a digital network (e.g., the Internet). Alternatively, the system may receive user search criteria, may determine that the search criteria matches one or more of tags 150, and may identify video content 110 as a relevant search result based on the matching of the search criteria to the one or more tags 150. Tags 150 may be used for other classification or identification of video content 110, and/or further expand the tag taxonomy for the multimodal multilabel tagging.

In some embodiments, the tags may be presented as data to a system or user. For instance, the tags may be presented as a word cloud. The system or user can use the data to understand the subject matter of video content 110 without having to watch or playback video content 110. The data can assist in storing, classifying, organizing, and/or processing video content 110. In some embodiments, the tags may be provided back to a dataset that is used to train and adapt multimodal multilabel tagging to a changing set of topics.

Some embodiments may perform combinational multimodal multilabel tagging. The combinational multimodal multilabel tagging may generate tags based on various combinations of modalities 120, 130, and/or 140, and/or extracted set of features 125, 135, and/or 145. For instance, sound characteristics identified from extracted set of features 145 of audio modality 140 may be complementary to and may assist in more accurately determining contextual relevant of text from extracted set of features 135 of text modality 130. Similarly, objects identified from extracted set of features 125 of video modality 120 may provide complimentary information to more accurately identify contextual relevance of extracted set of features 135 of text modality 130 and/or extracted set of features 145 of audio modality 140.

Figure 2:
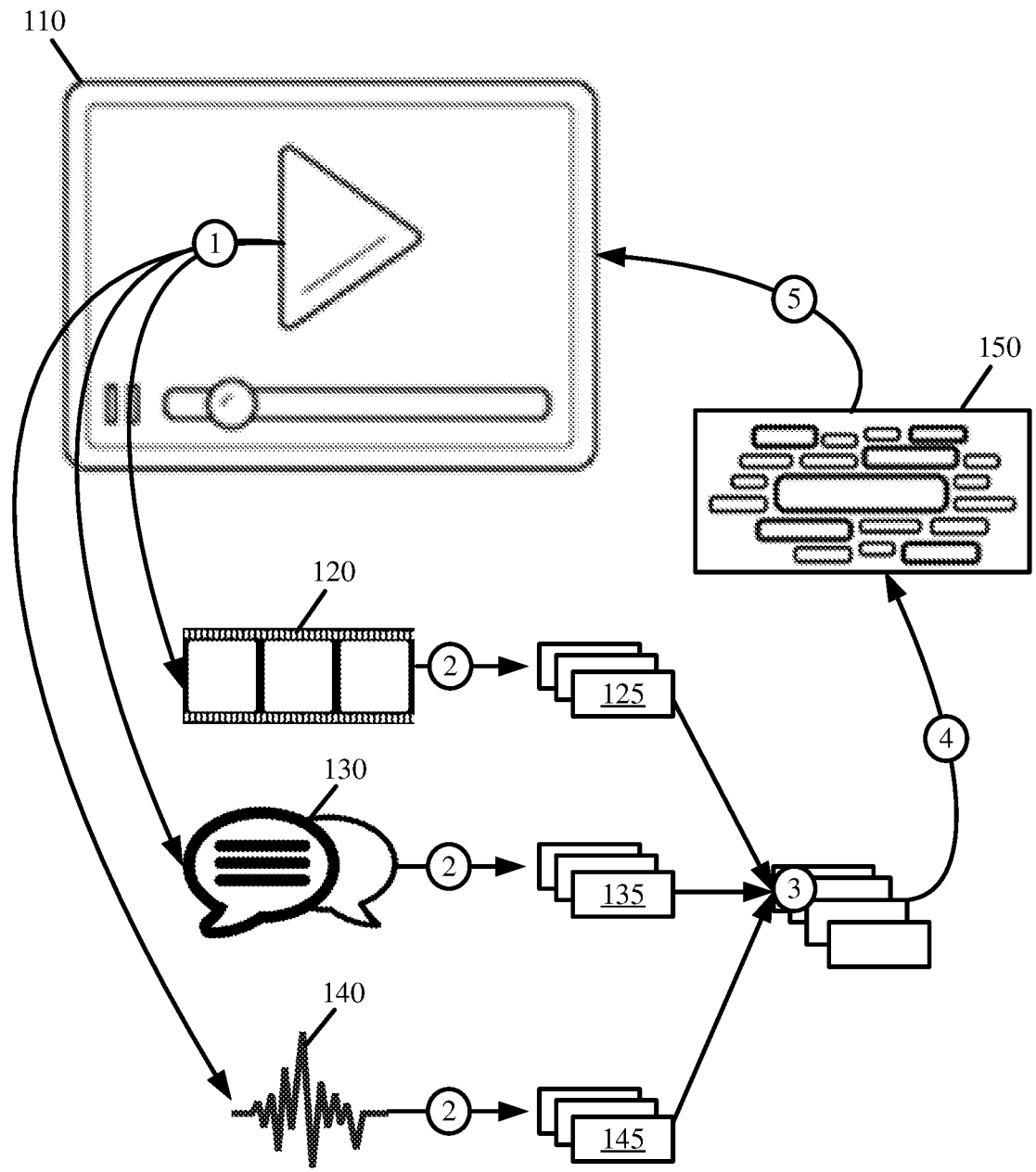
FIG. 2 presents an example of combinational multimodal multilabel tagging of video content in accordance with some embodiments presented herein.

FIG. 2 presents an example of combinational multimodal multilabel tagging of video content in accordance with some embodiments presented herein. Here again, video content 110 may be partitioned (at 1) into video modality 120, text modality 130, audio modality 140, and/or other modalities. The combinational multimodal multilabel tagging may include extracting (at 2) set of features 125 from video modality 120, set of features 135 from text modality 130, and set of features 145 from audio modality 140.

The combinational multimodal multilabel tagging may include combining (at 3) extracted features of different modalities 120, 130, and 140. In some embodiments, the features extracted from different modalities 120, 130, and 140 may be combined based on temporal relevance and/or contextual relevance.

An example of temporal relevance feature combination may include combining a first feature extracted from a first modality at a particular time within video content 110 with a second feature extracted from a second modality at the same particular time. The temporal relevance feature combination may be based on the images, text, and sounds at or about the same time within video content 110 being related and/or complimentary to one another. For instance, news related video content may provide images at a particular time that are complimentary to text about a story that is presented at the same particular time. In this example, the images may be used to more accurately determine the topic, content, and/or subject matter of the text.

An example of contextual relevance feature combination may include extracting a feature from video modality 120 identifying a particular landmark, and extracting a feature from text modality 130 identifying a meeting between world leaders. The combination of these features may identify that the meeting between world leaders took place in a country associated with the particular landmark or was otherwise related to the particular landmark. Other combinations may be based on similarity or identified relationships between features.

In some embodiments, the feature combinations may be used to determine topical importance and/or weight that should be attributed to a feature. Tags may be generated from features that are weighted more than other features as the weight may be an indication that a feature is of greater topical importance or is more directly related to the content and/or subject matter of video content 110. For instance, a sound extracted from audio modality 140 that is identified as a gunshot, an image of a gun extracted from video modality 120, and text extracted from text modality 130 referencing a crime can be combined as a single feature that is weighted more heavily (e.g., in terms of contextual relevance) than other features. Similarly, multiple instances of the same feature that are extracted from the same or different modalities may be combined as a single feature that is weighted more heavily than other features.

The combinational multimodal multilabel tagging may include generating (at 4) tags based on the various feature combinations. For instance, the combinational multimodal multilabel tagging may generate (at 4) tags based on the more frequently occurring or more relevant features (e.g., features combined based on temporal relevance and/or contextual relevance, features that are similar or related, etc.), while ignoring other less frequently or less relevant features.

The tags may be associated (at 5) with video content 110 as metadata. The metadata may allow for indexing and searching of video content 110. In some embodiments, the tags may be presented and/or stored as data that is separate from video content 110.

The multimodal multilabel tagging and/or combinational multimodal multilabel tagging (herein sometimes collectively referred to as "multimodal multilabel tagging" or individually as "multimodal multilabel tagging") may include global and local labeling of video content 110. The global labeling may include generating one or more tags that describe the overall topics of video content 110. The local labeling may include generating one or more tags that describe topics that for different parts of video content 110. For instance, a news clip may cover multiple political topics, and may therefore be globally labeled with "politics" and "US news" tags. A first segment of the news clip (e.g., first duration of two minutes) may cover a congressional race in a one state, a second segment of the news clip (e.g., second duration spanning a subsequent three minutes) may cover new legislation passed by Congress, and a third segment of the news clip (e.g., third duration spanning a final minute of the news clip) may cover a presidential press briefing. Each segment may be locally labeled with different tags to better identify the relevance of each segment, and also to allow for searching or indexing within video content 110.

Figure 3:
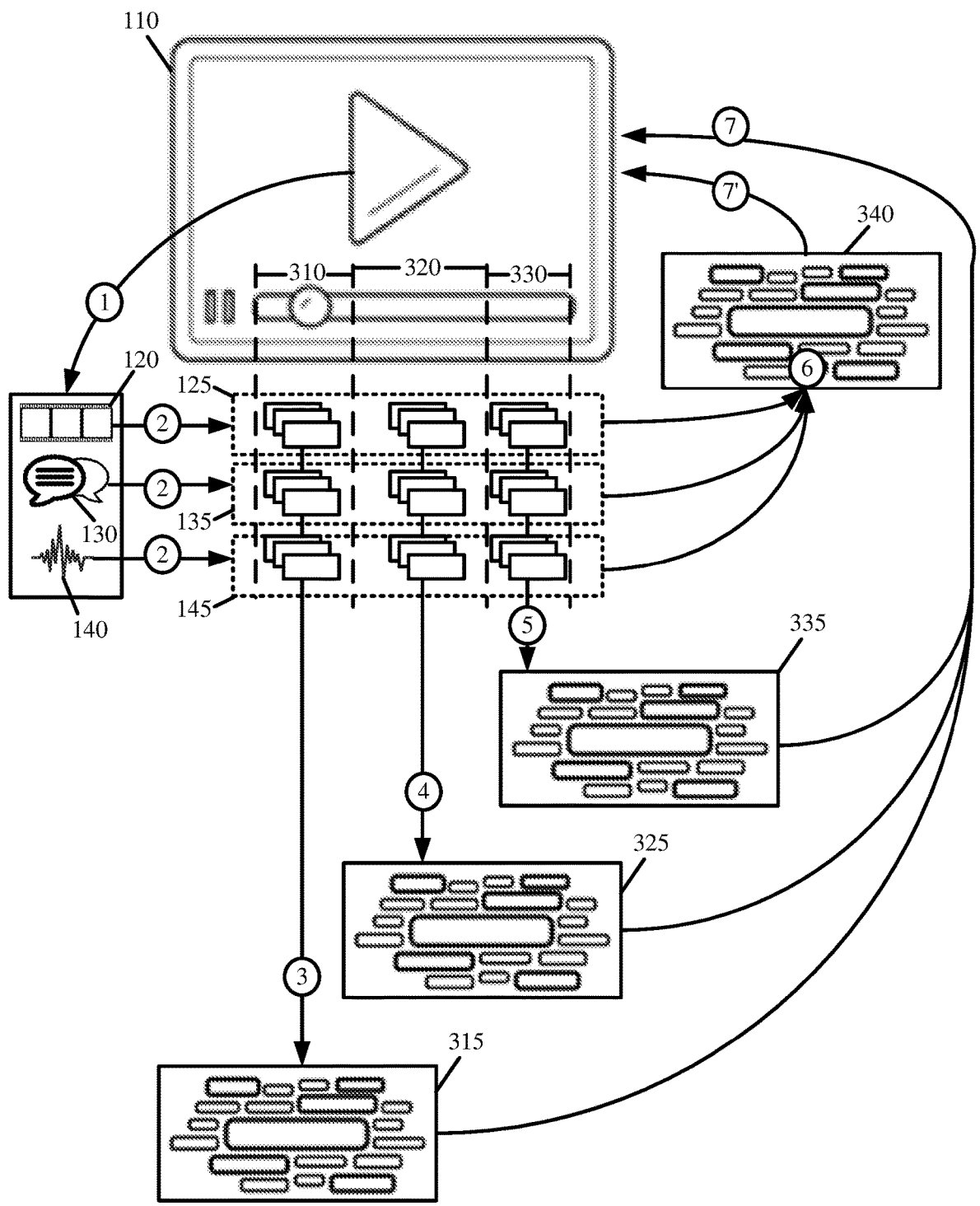
FIG. 3 presents an example of multimodal multilabel global and local tagging of video content in accordance with some embodiments presented herein.

FIG. 3 presents an example of multimodal multilabel global and local tagging of video content in accordance with some embodiments presented herein. In FIG. 3, video content 110 may be partitioned (at 1) into video modality 120, text modality 130, audio modality 140, and/or other modalities. For each modality 120, 130, and 140, the multimodal multilabel global and local tagging may include extracting (at 2) a respective set of features 125, 135, and 145 for different parts of video content 110. For instance, as shown in FIG. 3, set of features 125 may include a first subset of features that are extracted from video modality 120 over a first part 310 of video content 110, a second subset of features that are extracted from video modality 120 over a different second part 320 of video content 110, and a third subset of features that are extracted from video modality 120 over a different third part 330 of video content 110. In some embodiments, video content 110 may be statically divided into parts 310, 320, and 330 of equal length based a set time divider (e.g., 1 minute, 30 minutes, every hour, etc.). In some embodiments, video content 110 may be dynamically divided into parts 310, 320, and 330 of different lengths based on detected dividers. For instance, video content 110 may be divided in response to detected transition frames or other breaks in video content 110.

The multimodal multilabel global and local tagging may then include generating (at 3, 4, and 5) one or more local tags 315, 325, and 335 for identifying topics and content for each part 310, 320, and 330 of video content 110 based on extracted features from each modality 120, 130, and 140 during each part 310, 320, and 330, as well as generating (at 6) one or more global tags 340 for identifying overall topics and content of video content 110 based on the entire set of extracted features 125, 135, and 145. For instance, the local tag generation may include generating (at 3) first set of local tags 315 for labeling topics from first part 310 of video content 110 based on the first subset of features extracted from each modality 120, 130, and 140 over first part 310 of video content 110, generating (at 4) second set of local tags 325 for labeling topics from second part 320 of video content 110 based on the second subset of features extracted from each modality 120, 130, and 140 over second part 320 of video content 110, and generating (at 5) third set of local tags 335 for labeling topics from third part 330 of video content 110 based on the third subset of features extracted from each modality 120, 130, and 140 over third part 330 of video content 110. In some embodiments, different combinations of features from a subset of features may be used in generating local tags 315, 325, and 335 for a corresponding part 310, 320, or 330 of video content 110.

The global tag generation may include generating (at 6) one or more global tags 340 for labeling overall topics of video content 110 based on extracted features from sets of features 125, 135, and 145, either independently or in various combinations. In some embodiments, one or more global tags 340 may be generated (at 6) based on local tags 315, 325, and/or 335. For instance, one or more of local tags 315, 325, and 335 may be used as global tags 340, and/or one or more of local tags 315, 325, and 335 may be combined and/or used to derive one or more global tags 340.

Local tags 315, 325, and 335 may be added (at 7) as metadata to video content 110 to index and permit searching within video content 110. Global tags 340 may also be added (at 7') as metadata to video content 110. The tags 315, 325, 335, and 340 may also be presented as data to a system or user.

Figure 4:
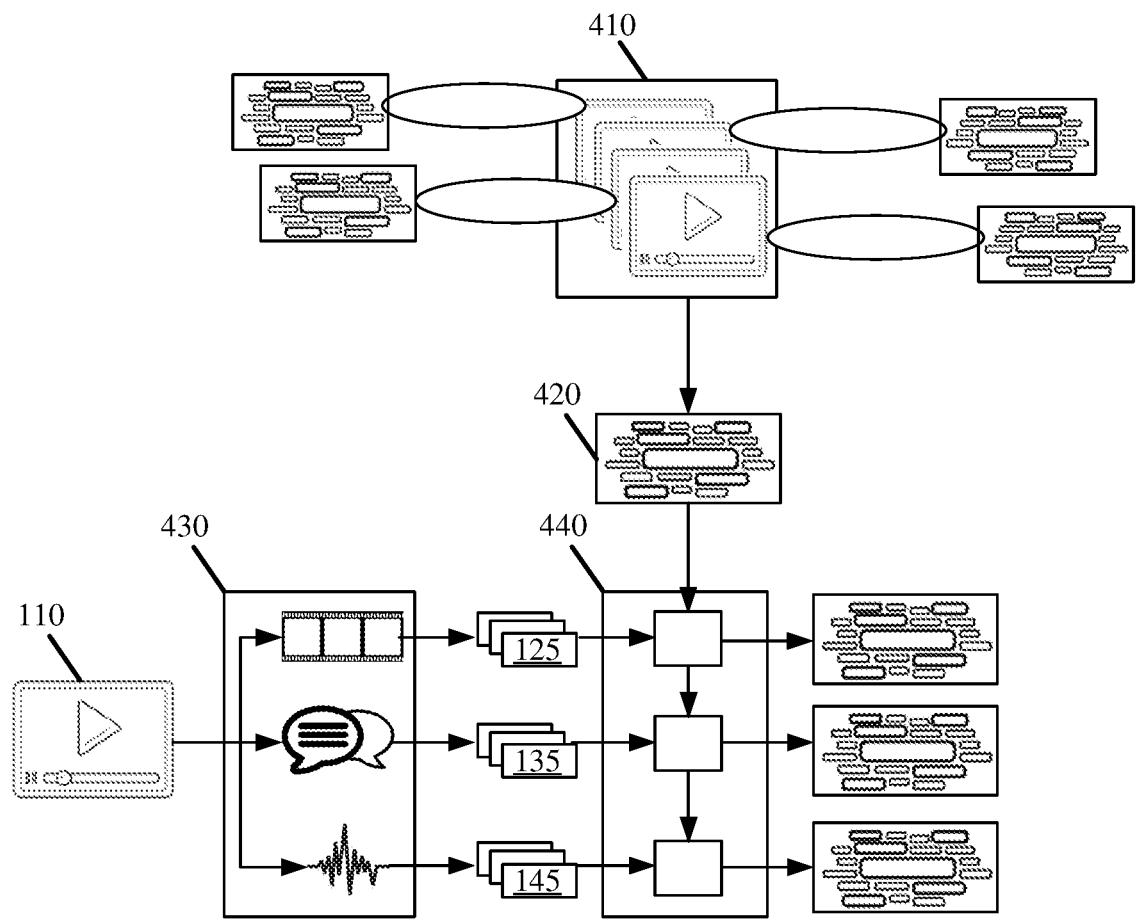
FIG. 4 illustrates an example environment, in which one or more embodiments, described herein, may be implemented.

FIG. 4 illustrates an example environment 400, in which one or more embodiments, described herein, may be implemented. Environment 400 may represent a system and/or devices of a system for multimodal multilabel tagging in accordance with some embodiments.

As shown in FIG. 4, environment 400 may include dataset 410, tag taxonomy 420, modality generator 430, and tag generator 440. The quantity of devices and/or components, illustrated in FIG. 4, is provided for explanatory purposes only. In practice, environment 400 may include additional devices and/or components; fewer devices and/or components; different devices and/or components; or differently arranged devices and/or components than illustrated in FIG. 4. For instance, modality generator 430 may include a video modality generator, a text modality generator, and/or an audio modality generator. Alternatively, or additionally, one or more of the devices or components of environment 400 may perform one or more functions described as being performed by another one or more of the devices or components of environments 400. For instance, modality generator 430 may be incorporated as part of tag generator 440. Devices of environment 400 may operate from the same set of hardware or may interconnect with each other and/or other systems or devices via wired connections, wireless connections, or a combination of wired and wireless connections.

Dataset 410 may include several video clips that are aggregated over some period of time from one or more sources. For instance, dataset 410 may be formed from video content that are aggregated from different properties (e.g., politics, domestic news, international news, sports, finance, etc.) of a particular news site, or from different news sites (e.g., CNN, Fox News, Washington Post, New York Times, etc.) over the past year. Dataset 410 may also include video content directed to different subject matter. For instance, dataset 410 may include a first set of video content related to entertainment and movies, a second set of video content related to news, and a third set of video content related to travel.

Each video content in dataset 410 may be labeled with one or more tags. The tags may be verified by one or more sources to accurately reflect the topics, content, and/or subject matter of each video content. In some embodiments, each video content of dataset 410 is presented to one or more humans that label the video content with one or more tags. The tags may be stored in conjunction with the video content stored by dataset 410, and may be used as training models or reference points for the automated labeling described herein. In some embodiments, the multimodal multilabel tagging is performed on each video content in dataset 410. This may include the above described feature extraction, and the automatic generation of tags. The tags may then be presented to one or more humans along with the video content, and the humans validate the accuracy of the automatically generated tags, or select a subset of the automatically generated tags that best represent the video content before the extracted features and one or more tags are associated with the video content in dataset 410.

In some embodiments, dataset 410 may also store a weighting for different modalities based on different video classification. The weighting associated with a particular video classification may be used to adjust the relevance attributed to the extracted features from different modalities when labeling video content of that particular video classification. For instance, dataset 410 may provide a greater weight to a first modality (e.g., extracted features from the first modality) for game related video content, and may provide a greater weight to a second modality for news related video content.

In some embodiments, dataset 410 may also store modality combinations when generating tags for different video classifications. For instance, the system may determine that using combinations of features from video modality 120 and text modality 130 may generate more accurate or more relevant tags for a first type of video content than using features from video modality 120 or text modality 130 alone, and may determine that using features from text modality 130 may generate more accurate or more relevant tags for a second type of video content than using features of other modalities or combinations of features from different modalities. The different modality weightings and combinations may be determined based on machine learning or training of the system with a baseline set of video content.

Tag taxonomy 420 may represent the set of tags that can be used by the multimodal multilabel tagging to label the topics, content, and/or subject matter of newly received video content (e.g., video content 110). Tag taxonomy 420 may be based or derived from the tags used to label video content in dataset 410.

In some embodiments, tag taxonomy 420 may include different subsets of tags that represent taxonomies for different video classifications. For instance, tag taxonomy 420 may include a first taxonomy with tags for labeling news related video content, and a second taxonomy with different tags for labeling video content that is classified as something other than news.

Tag taxonomy 420 may include a hierarchical organization of the tags. The hierarchical organization may provide high-level or more generic tags at the root (e.g., the top of the hierarchy), and more defined or descriptive tags at each tier below the root. Therefore, the closer the tag is to the root or top of taxonomy 420, the more generic the topic, content, and/or subject matter of the tag. For instance, a top-level tag of "sports" may include a first level of tags including "basketball", "soccer", "football", "golf", etc., and the "basketball" first-level tag may include second-level tags "New York Knicks", "Los Angeles Lakers", "trades", etc.

In some embodiments, tag taxonomy 420 may grow or change over time as video content within dataset 410 changes. For instance, tag taxonomy 420 may grow to include a new tag for a new topic that did not occur in the original set of video content in dataset 410, but that repeatedly occurs in new video content that is added to dataset 410. Additional tags may be added in the tag hierarchy when multiple instances of a particular upper-tier tag are used, and attached lower-tier tags are not used. In this case, video content may be labeled with generic tags, and new descriptive (e.g., lower-tier) tags may be added to identify new topics, content, and/or subject matter. Dataset 410 or tag taxonomy 420 may also track usage of tags within the taxonomy, and may remove tags that are infrequently or never used to label video content. In some embodiments, tag taxonomy 420 may remain static with a sufficiently large set of tags that can be used to label any video content.

In some embodiments, tag taxonomy 420 may be integrated as part of dataset 410.

In other words, the tags need not be arranged in a taxonomy, and may exist as part of dataset 410 or other non-structured set that may be mutually exclusive of dataset 410. Dataset 410 and tag taxonomy 420 may be stored in one or more storage devices of environment 400. The storage devices may be accessible to modality generator 430 and/or tag generator 440. Modality generator 430 and/or tag generator 440 may execute on or may include computational resources of environment 400. Dataset 410, tag taxonomy 420, modality generator 430, and/or tag generator 440 may therefore represent components of a system for multimodal multilabel tagging, combinational multimodal multilabel tagging, and/or multimodal multilabel global and local tagging.

Modality generator 430 may receive an mp4 or another file with encoded video content. Modality generator 430 may then extract video modality 120, text modality 130, audio modality 140, and/or other modalities from the file or video content, and may extract one or more features from each modality 120, 130, and 140. Modality generator 430 may be configured with various tools and/or devices for modality and feature extraction.

Modality generator 430 may produce video modality 120 by isolating frames of the video content. Modality generator 430 may use a tool such as FFmpeg for the frame extraction.

Figure 5:
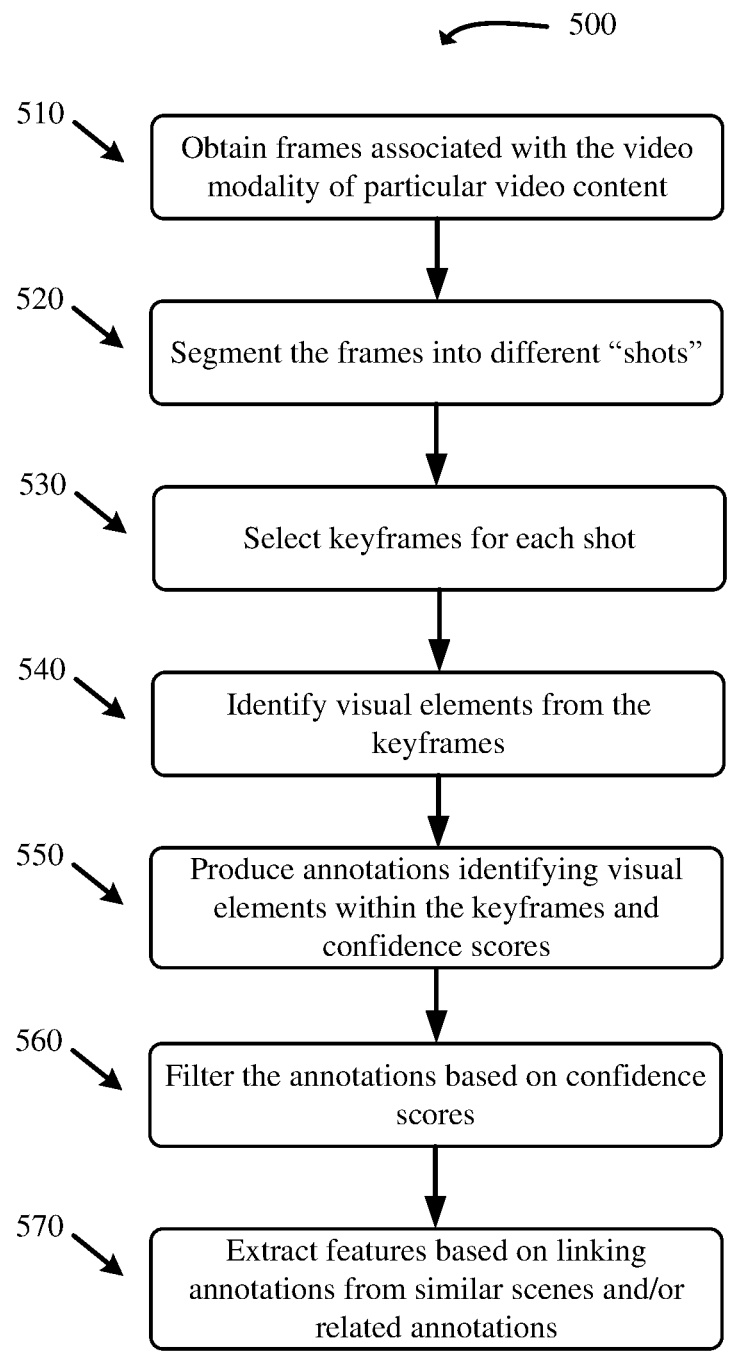
FIG. 5 presents a process for feature extraction from the video modality in accordance with some embodiments presented herein.

FIG. 5 presents process 500 for feature extraction from video modality 120 in accordance with some embodiments presented herein. Process 500 may include obtaining (at 510) frames associated with video modality 120 of video content 110.

Process may include segmenting (at 520) the frames into different "shots". A shot may include a set of frames within a common boundary or a continuous scene. For instance, a shot may include a sequence of frames of a scene without a break or other transition frames for cutting, fading, dissolving, and/or wiping to a different scene. Process 500 may include selecting (at 530) one or more keyframes for each shot. The keyframes may correspond to frames of shot that clearly present the visual elements of a shot. In some embodiments, the keyframes may be selected based on a stillness metric and/or quality metric. A video processing library (e.g., Hecate) may be used to detect shot boundaries, discard low-quality frames, and/or select non-duplicate keyframes.

Process 500 may include identifying (at 540) visual elements from the one or more keyframes. A classifier with a vocabulary of classes or concepts that include objects, scenes, and/or other visual descriptors (e.g., colors, shapes, etc.) may be used to produce (at 550) annotations that identify some of the visual elements within the one or more keyframes. Each annotation may be a word that describes an identified visual element. The classifier may also assign a confidence score to each annotation or identified visual element. The confidence score may represent a degree to which a visual element in one or more keyframes matches to a class or concept in the classifier vocabulary. The confidence score may also be based on the amount of time or the number of keyframes in which a visual element appears.

Process 500 may include filtering (at 560) the annotations to retain the annotations for identified visual elements with the highest confidence scores in different shots, or to retain the annotations with confidence scores that exceed a threshold value. The retained set of annotations may represent the video (e.g., images from video modality 120) as words in a piece of text.

Process 500 may include linking (at 570) annotations that are found in similar scenes and/or related annotations. For instance, annotations for "people", "stadium", and "game" found within a scene or shot may be linked to provide information about the context in which the annotations were found, and their dependencies with other annotations seen in the same context. The linked annotations may represent the extracted features of video modality 120 from which one or more tags may be generated when labeling video content 110.

Modality generator 430 may produce text modality 130 by obtaining text representing dialog within video content 110. Modality generator 430 may produce text modality 130 from closed captions that are included with video content 110 as metadata or as another resource. In some embodiments, modality generator 430 may use an automated speech recognition and transcription tool to generate the closed captions or the text for the dialog within video content 110.

Feature extraction from text modality 130 may include formatting (e.g., convert all characters to lowercase) and/or tokenizing the text. Feature extraction may also include applying a text-based multi-label learning ("MLL") method (e.g., DocTag2Vec) to label the tokenized text. The MLL method may be trained using dataset 410 (e.g., features extracted from text modality 130 for video content in dataset 410), or text-based articles or documents. The MLL method may automatically learn the representation of words, documents, and tags from dataset 410, may use a k-nearest neighbor search to generate tags for the tokens that are obtained from text modality 130 of previously unseen video content 110.

Modality generator 430 may produce audio modality 140 by extracting the audio from video content 110. For instance, FFmpeg may be used to extract the audio from video content 110 at a 16 Kilohertz sampling rate, and to store the audio in a way file.

Feature extraction from audio modality 140 may include analyzing the audio, and deriving various characteristics of the audio based on the analysis. For instance, openSMILE and/or other audio analysis tools may be used to detect emotion, age, gender, and/or other characteristics of a speaker, weighting of the auditory spectrum, frequency, pitch period deviations, average absolute different between jitters, local (e.g., frame-to-frame) jitter, harmonics-to-noise ratio, mel-frequency cepstral coefficients, local pitch period amplitude deviations, and/or other characteristics of the audio. Various statistical functions (e.g., arithmetic mean, centroid, inter-quartile range, linear predictive coding, max segment length, spectral centroid, entropy, flux, harmonicity, kurtosis, skewness, zero crossing range, simple moving average, slope, etc.) may be applied to the identified audio characteristics as part of classifying acoustic events as different features of audio modality 140. Examples of features that may be extracted from audio modality 140 include exhaling, kissing, gunshots, snarling, shouting, beeping, clucking, grunting, laughing, alarms, cheering, screaming, and other non-speech acoustic events.

Tag generator 440 may label video content 110 with one or more tags that are generated based on the extracted features from one or more of video modality 120, text modality 130, audio modality 140, and/or other modalities. Tag generator 450 may generate tags that identify topics, content, and/or subject matter of video content 110 based on features of each modality in isolation, and/or based on combinations of features from different modalities.

Tag generator 450 may determine topical tags for video content 110 by matching extracted features from different modalities of video content 110 to tags from tag taxonomy 420 that are associated with the same or related features of video content in dataset 410. For instance, extracted features related to hotels, cuisine, and activities may be associated with a travel tag, and extracted features providing scores and various team names may be associated with a first tag for sports and a second tag for a particular sport.

In some embodiments, tag generator 450 may operate according to an MLL model. Extracted features from video content in dataset 410 and tags derived from those extracted features in tag taxonomy 420 may be used to train the MLL model of tag generator 450. For instance, tag generator 450 may be trained with a label dimensionality of 336 tags based on thousands of features and feature combinations linking to the tags. In training tag generator 450, different weights may be attributed to features of different modalities, and different feature combinations may be linked to different tags to indicate that features of different modalities may complement one another and may lead to more accurate labeling of video content 110. In some embodiments, different instances of tag generator 450 may be trained based on different tag taxonomies so that each instance is trained to label different types of video content (e.g., news related video content, entertainment video content, etc.).

In some embodiments, tag generator 450 may use a random forest classifier to generate tags for video content 110. For instance, tag generator 450 may produce a random forest of a particular depth (e.g., 8) with multiple estimators (e.g., 10). The random forest may be generated by training tag generator 450 using dataset 410. In particular, tag generator 450 may produce the random forest based on the extracted features from one or more modalities 120, 130, and/or 140 of video content in dataset 410 that produced various tags in tag taxonomy 420. In producing the random forest, tag generator 450 identifies tags that are generated based on relationships between one or more features of one or more modalities. Upon receiving new video content and extracting features from different modalities 120, 130, and 140 of the new video content, tag generator 450 may traverse the random forest using the extracted features in order to label the new video content with tags that are contextually relevant and that identify topics, content, and/or subject matter of the new video content.

In some embodiments, tag generator 450 may be trained based on tags from tag taxonomy 420 that are derived from one or more extracted features, from text modality 130 of video content in dataset 410, that are identified from annotating/labeling related tokenized text, and/or one or more extracted features, from video modality 120 of video content in dataset 410, that are identified from annotating/labeling of interrelated visual elements. Tag generator 450 may then perform a k-nearest neighbor search using extracted features of new video content in order to predict tags for the new video content.

Figure 6:
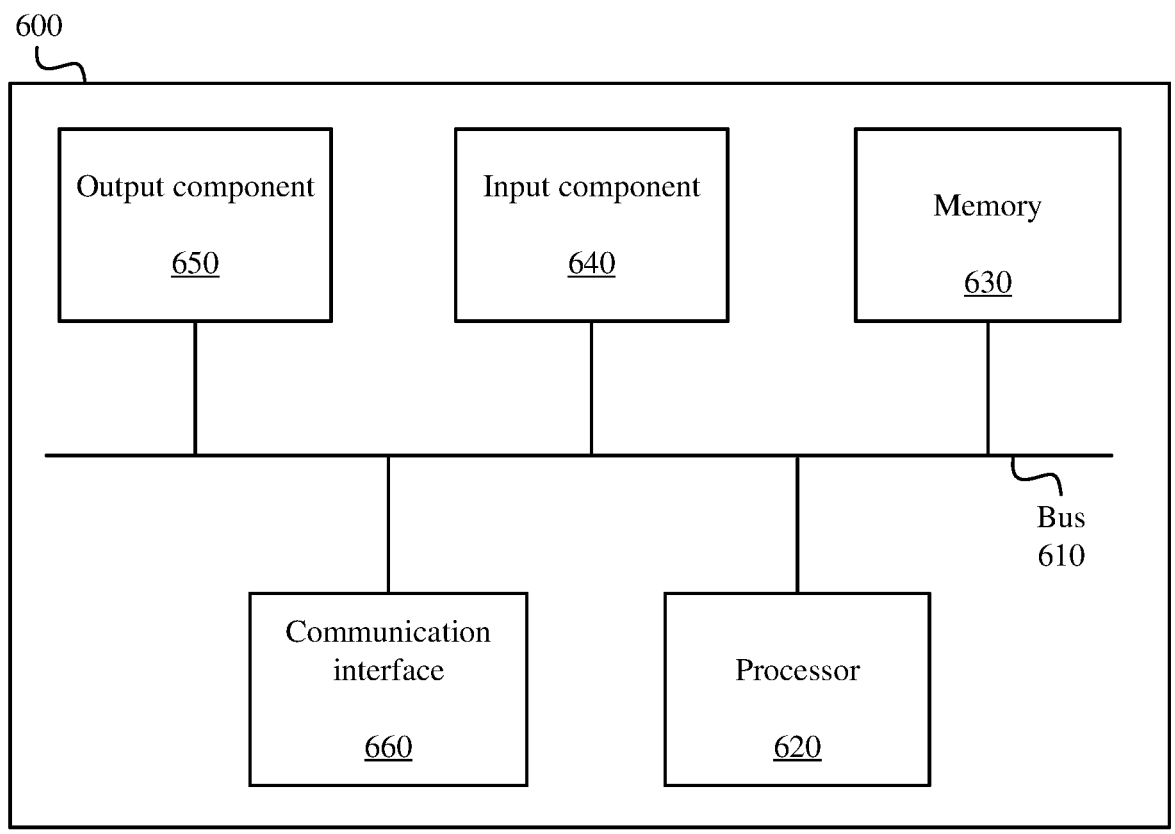
FIG. 6 illustrates example components of one or more devices, according to one or more embodiments described herein.

FIG. 6 is a diagram of example components of device 600. Device 600 may be used to implement certain of the devices described above (e.g., the system for multimodal multilabel tagging, modality generator 430, and tag generator 440). Device 600 may include bus 610, processor 620, memory 630, input component 640, output component 650, and communication interface 660. In another implementation, device 600 may include additional, fewer, different, or differently arranged components.

Bus 610 may include one or more communication paths that permit communication among the components of device 600. Processor 620 may include a processor, microprocessor, or processing logic that may interpret and execute instructions. Memory 630 may include any type of dynamic storage device that may store information and instructions for execution by processor 620, and/or any type of nonvolatile storage device that may store information for use by processor 620.

Input component 640 may include a mechanism that permits an operator to input information to device 600, such as a keyboard, a keypad, a button, a switch, etc. Output component 650 may include a mechanism that outputs information to the operator, such as a display, a speaker, one or more light emitting diodes ("LEDs"), etc.

Communication interface 660 may include any transceiver-like mechanism that enables device 600 to communicate with other devices and/or systems. For example, communication interface 660 may include an Ethernet interface, an optical interface, a coaxial interface, or the like. Communication interface 660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 600 may include more than one communication interface 660. For instance, device 600 may include an optical interface and an Ethernet interface.

Device 600 may perform certain operations relating to one or more processes described above. Device 600 may perform these operations in response to processor 620 executing software instructions stored in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions stored in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
   receiving a request comprising one or more topics by which to select desired video content from a plurality of video content;
   determining, from processing images of particular video content from the plurality of video content, a first set of features that classify to the one or more topics;
   determining, from processing audio of the particular video content, a second set of features that classify to the one or more topics; and
   providing, in response to the request, the particular video content based on at least one feature from the first and second sets of features that classify to a common topic of the one or more topics.

2. The method of claim 1, wherein the first set of features comprises objects in the images that relate to the one or more topics, and wherein the second set of features comprises dialog in the audio that relate to the one or more topics.

3. The method of claim 1, wherein the first set of features comprises objects in the images that visually represent the one or more topics, and wherein the second set of features comprises sound characteristics in the audio that audibly represent the one or more topics.

4. The method of claim 1 further comprising:
   filtering the first set of features to a first subset of features, wherein filtering comprises:
      retaining features in the first subset of features that appear in at least a threshold number of images; and
      excluding features from the first subset of features that do not appear in at least the threshold number of images.

5. The method of claim 4 further comprising:
   filtering the second set of features to a second subset of features, wherein filtering the second set of features comprises:
      retaining sound features that repeat and that classify to the one or more topics; and
      excluding sound features that do not repeat or do not classify to the one or more topics.

6. The method of claim 1, wherein determining the second set of features comprises:
   extracting a first subset of features for the second set of features from dialog in the audio that references the one or more topics; and
   extracting a second subset of features for the second set of features from sound characteristics that correspond to sounds of the one or more topics.

7. The method of claim 1, wherein determining the first set of features comprises:
   identifying objects in the images with a connection to the one or more topics.

8. The method of claim 1, wherein the first set of features classify to the one or more topics based on one or more of contextual relevance or temporal relevance between objects in the images and the one or more topics, and wherein the second set of features classify to the one or more topics based on one or more of contextual relevance or temporal relevance between sounds in the audio and the one or more topics.

9. The method of claim 1, wherein providing the particular video content comprises:
   linking a tag with which to identify the particular video content based on a feature of the first set of features and a feature of the second set of features classifying to a common topic from the one or more topics; and
   retrieving the particular video content from the plurality of video content based on the tag matching to at least one of the one or more topics.

10. The method of claim 1 further comprising:
    determining at least one of a temporal match or a contextual match between a first feature of the first set of features and a second feature of the second set of features; and
    linking to the particular video content, a tag derived from a combination of the first feature and the second feature.

11. The method of claim 1, wherein determining the second set of features comprises:
    obtaining closed captions of the video content.

12. The method of claim 1 further comprising:
    providing a tag taxonomy comprising a plurality of topics with which the plurality of video content is labeled;
    matching the one or more topics from the request to a set of topics of the particular video content based on different combinations of the first set of features and the second set of features that map to the set of topics in the tag taxonomy.

13. The method of claim 1 further comprising:
    extracting a first modality and a second modality from the particular video content, the first modality comprising the images of the particular video content and the second modality comprising the audio of the particular video content.

14. The method of claim 1 further comprising:
    assigning a different score to each feature of the first set of features based on a degree to which a visual element in each feature of the first set of features matches to a topic from a plurality of topics.

15. The method of claim 14 further comprising:
    assigning a different score to each feature of the second set of features based on a degree to which a spoken phrase or sound in each feature of the second set of features matches to a topic from the plurality of topics.

16. The method of claim 15 further comprising: tagging the particular video content with the one or more topics based on a first subset of the first set of features and the second set of features having scores that are greater than scores of a different second subset of the first set of features and the second set of features.

17. The method of claim 1 further comprising:
    identifying a particular topic of the particular video content based on the image associated with one feature of the first set of features matching to subject matter identified from one feature of the second set of features; and
    matching the particular topic of the particular video content to the one or more topics from the request.

18. The method of claim 17 further comprising:
    linking the particular topic to one or more tags from a tag taxonomy comprising a plurality of tags corresponding to different topics; and labeling the particular video content with the one or more tags, wherein said labeling comprises adding the one or more tags as metadata of the particular video content.

19. A device comprising:
a non-transitory computer-readable medium storing a set of processor-executable instructions; and
one or more processors configured to execute the set of processor-executable instructions, wherein executing the set of processor-executable instructions causes the one or more processors to:
  receive a request comprising one or more topics by which to select desired video content from a plurality of video content;
  determine, from processing images of particular video content from the plurality of video content, a first set of features that classify to the one or more topics;
  determine, from processing audio of the particular video content, a second set of features that classify to the one or more topics; and
  provide, in response to the request, the particular video content based on at least one feature from the first and second sets of features that classify to a common topic of the one or more topics.

20. A non-transitory computer-readable medium, storing a set of processor-executable instructions, which, when executed by one or more processors, cause the one or more processors to:
  receive a request comprising one or more topics by which to select desired video content from a plurality of video content;
  determine, from processing images of particular video content from the plurality of video content, a first set of features that classify to the one or more topics;
  determine, from processing audio of the particular video content, a second set of features that classify to the one or more topics; and
  provide, in response to the request, the particular video content based on at least one feature from the first and second sets of features that classify to a common topic of the one or more topics.

* * * * *